JOHN B. SMITH.
Improvement in Grinding Mills.
No. 121,819. Patented Dec. 12, 1871.
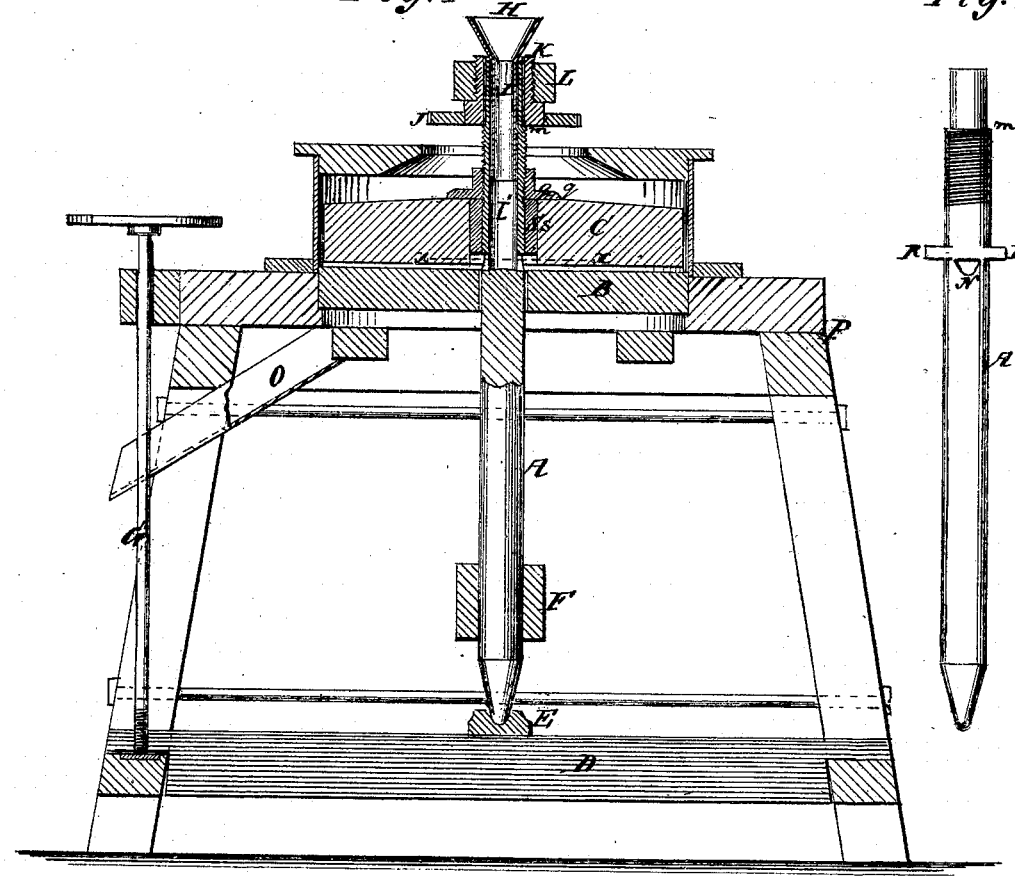
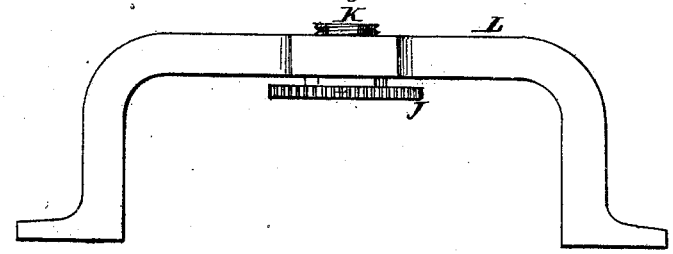
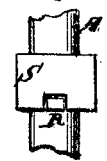
Witnesses:
E. Wolff.
Francis McArdle
Inventor:
J. B. Smith
Per Munn & Co.
Attorneys.

UNITED STATES PATENT OFFICE.

JOHN B. SMITH, OF BOWENSBURG, ILLINOIS.

IMPROVEMENT IN GRINDING-MILLS.

Specification forming part of Letters Patent No. 121,819, dated December 12, 1871.

*To all whom it may concern:*

Be it known that I, JOHN B. SMITH, of Bowensburg, in the county of Hancock and State of Illinois, have invented a new and useful Improvement in Grinding-Mills; and I do hereby declare that the following is a full, clear, and exact description thereof, which will enable others skilled in the art to make and use the same, reference being had to the accompanying drawing forming part of this specification.

This invention relates to a new and useful improvement in mills for grinding grain; and consists in the construction, arrangement, and combination of parts hereinafter described.

In the accompanying drawing, Figure 1 represents a sectional elevation of a mill constructed according to my invention. Fig. 2 is a view of the spindle detached. Fig. 3 is a view of the yoke or spindle-support. Fig. 4 is a section of Fig. 1 taken on the line $x\,x$. Fig. 5 is a detail of the spindle and bushing in the runner.

Similar letters of reference indicate corresponding parts.

A is the spindle, which is hollow down to the bed-stone. B is the bed-stone. C is the runner or revolving stone. D is the bridge-tree. E is the spindle-step on the bridge-tree. F is the driving-pulley. G is a screw-rod for raising and lowering the spindle. H is the hopper having a tubular neck, I, which enters the tubular portion of the spindle, as seen in Fig. 1. J is a hand-wheel, and K is a sleeve-screw combined therewith. The screw works in the yoke L. N represents apertures in the spindle, through which the grain which is put into the hopper is discharged between the stones. The flour or meal is discharged by the spout O. P represents the husk of the mill. There is a bushing in the bed-stone where the spindle has a bearing, (not shown in the drawing.) $q$ is a nut which screws down tightly onto the runner, as seen in Fig. 1. R represents projections on the spindle, which enter notches in the lower end of the bush. S is the runner, and acts as drivers, but the bush is fast in the stone and the spindle is fast in the bush. The runner may be driven by means of a belt on the pulley F, or by means of gearing, or in any other suitable manner.

By constructing my mill in the above-described manner I am enabled to adjust the hopper H, by means of the hand-wheel J, according as the riddle or large hopper from which the grain is delivered to it is adjusted for slow or fast feed. By means of the hand-wheel J and sleeve-screw K the spindle A is held more steadily in place, while the nut $q$ serves the purpose of securing the bushing S in the eye of the stone and in connection with the lugs or projections R on the spindle.

The method of feeding the grain through the spindle economizes space and reduces cost, and no open annular space is left round it in the eye of the stone, as is the case in mills of the ordinary construction.

Having thus described my invention, I claim as new and desire to secure by Letters Patent—

1. The spindle A, with the hollow portion I' and orifices N N, arranged substantially as described.

2. The hand-wheel J, sleeve-screw K, hopper H, and yoke L, arranged as described, whereby said hopper may be adjusted vertically.

3. The spindle A, constructed as described, in combination with the hopper H and tube or neck I, substantially as specified.

4. The nut $q$, in combination with the hollow spindle A, as shown.

5. The combination of the bed-stone B, runner C, and spindle A, when provided with the hollow portion I' and orifices N, substantially as and for the purposes set forth.

The above specification of my invention signed by me this 21st day of August, 1871.

JOHN B. SMITH.

Witnesses:
　JOS. IVINS,
　W. H. TUSCAN.

(57)